(12) United States Patent
Liang (10) Patent No.: US 9,612,503 B2
(45) Date of Patent: Apr. 4, 2017

(54) HYBRID MOS OPTICAL MODULATOR (75) Inventor: Di Liang, Santa Barbara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 138 days.

(21) Appl. No.: 14/385,250

(22) PCT Filed: Apr. 30, 2012

(86) PCT No.: PCT/US2012/035893
§ 371 (c)(1),
(2), (4) Date: Sep. 15, 2014

(87) PCT Pub. No.: WO2013/165376
PCT Pub. Date: Nov. 7, 2013

(65) Prior Publication Data
US 2015/0055910 A1 Feb. 26, 2015

(51) Int. Cl.
G02F 1/035 (2006.01)
G02F 1/225 (2006.01)
G02F 1/025 (2006.01)
G02B 6/125 (2006.01)
G02B 6/136 (2006.01)
G02B 6/12 (2006.01)
(Continued)

(52) U.S. Cl.
CPC ........... *G02F 1/2257* (2013.01); *G02B 6/125* (2013.01); *G02B 6/136* (2013.01); *G02F 1/025* (2013.01); *G02B 2006/12061* (2013.01); *G02B 2006/12142* (2013.01); *G02B 2006/12145* (2013.01); *G02B 2006/12159* (2013.01); *G02F 2001/0153* (2013.01); *G02F 2001/212* (2013.01); *G02F 2001/213* (2013.01); *G02F 2201/063* (2013.01); *G02F 2202/102* (2013.01); *G02F 2202/105* (2013.01)

(58) Field of Classification Search
None
See application file for complete search history.

(56) References Cited

U.S. PATENT DOCUMENTS 7,217,584 B2 5/2007 Yue et al.
8,488,917 B2 * 7/2013 Manipatruni ......... G02F 1/2257
385/2
(Continued)

FOREIGN PATENT DOCUMENTS

CN 101467083 A 6/2009
CN 100514099 C 7/2009

OTHER PUBLICATIONS

Basak, J. et al., Developments in Gigascale Silicon Optical Modulators Using Free Carrier Dispersion Mechanisms, Apr. 15, 2008, Advances in Optical Technologies, vol. 2008, 10 pages.
(Continued)

Primary Examiner — Hemang Sanghavi
(74) Attorney, Agent, or Firm — Hewlett Packard Enterprise Patent Department (57) ABSTRACT A hybrid MOS optical modulator. The optical modulator includes an optical waveguide, a cathode comprising a first material and formed in the optical waveguide, and an anode comprising a second material dissimilar from the first material and formed in the optical waveguide, the anode adjoining the cathode, a capacitor being defined between the anode and the cathode.

18 Claims, 11 Drawing Sheets (51) Int. Cl.
  *G02F 1/015* (2006.01)
  *G02F 1/21* (2006.01)

(56) References Cited

U.S. PATENT DOCUMENTS

| | | | |
|---|---|---|---|
| 8,538,206 B1* | 9/2013 | Fish | G02F 1/025 385/2 |
| 9,110,314 B2* | 8/2015 | Tu | G02F 1/025 |
| 2005/0207704 A1 | 9/2005 | Keyser et al. | |
| 2006/0063679 A1 | 3/2006 | Yue et al. | |
| 2009/0110342 A1 | 4/2009 | Webster et al. | |
| 2010/0060970 A1* | 3/2010 | Chen | G02F 1/025 359/245 |
| 2010/0098372 A1 | 4/2010 | Manipatruni et al. | |
| 2010/0215309 A1 | 8/2010 | Shubin et al. | |
| 2010/0295083 A1 | 11/2010 | Celler | |
| 2011/0073989 A1 | 3/2011 | Rong et al. | |
| 2011/0176762 A1 | 7/2011 | Fujikata et al. | |
| 2011/0180795 A1* | 7/2011 | Lo | G02F 1/025 257/51 |
| 2011/0211786 A1 | 9/2011 | Ushida et al. | |
| 2012/0189239 A1* | 7/2012 | Tu | G02F 1/025 385/2 |
| 2012/0257850 A1* | 10/2012 | Fujikata | G02F 1/025 385/3 |
| 2014/0177994 A1* | 6/2014 | Chen | H01L 33/58 385/2 |

OTHER PUBLICATIONS

Fang, Alexander W. et al., Electrically Pumped Hybrid Algainas-silicon Evanescent Laser, Optics Express, Oct. 2, 2006, vol. 14, No. 20, pp. 9203-9210.
International Search Report & Written Opinion, Dec. 26, 2012, PCT Patent Application No. PCT/US2012/035893, 10 pages.
Extended European Search Report received in EP Application No. 12875835.6, Feb. 18, 2016, 15 pages.
International Preliminary Report on Patentability received in PCT Application No. PCT/US2012/035893, Nov. 13, 2014, 7 pages.
Liang, D. et al., "Optimization of Hybrid Silicon Microring Lasers," Photonics Journal, IEEE 3.3, 2011, pp. 580-587.
Liang, D., "III-V-on-Silicon Hybrid Integration, Materials, Devices, and Applications," IEEE Winter Topicals, 2011, pp. 151-152.
Partial Supplementary European Search Report received in EP Application No. 12875835.6, Nov. 11, 2015, 7 pages.

* cited by examiner

HYBRID MOS OPTICAL MODULATOR

BACKGROUND

In optical transmitters, optical modulators are used to modulate optical carriers (light beams) with analog or digital signals for transmission through optical fibers. A typical wavelength division multiplexing-based optical transmitter uses several lasers each operating at a different wavelength to generate several different optical carriers. Each carrier passes through its own optical modulator where it is modulated with a signal to be transmitted. Then the modulated carriers are fed through an optical multiplexer into an optical fiber for transmission. As one of some attractive silicon-based optical modulator designs, a silicon MOS capacitor adjoins a silicon optical waveguide. A signal applied across the capacitor induces an accumulation of charge near the center of the capacitor. This accumulation of charge modifies the-refractive index of the optical waveguide as well as its propagation loss. Modifying the refractive index causes a phase shift in a beam of light propagating through the waveguide, thereby phase-modulating the light. When phase shift is utilized in optical waveguide components such as Mach-Zehnder interferometers (MZI), ring resonators, or Fabry-Perot (FP) resonators, the optical waveguide component transforms optical phase shift into optical power change to realize optical intensity modulation. When analog or constant optical power reduction is the purpose instead of coding an electrical signal into an optical signal, the optical modulator can be used as an optical attenuator.

BRIEF DESCRIPTION OF THE DRAWINGS

The figures are not drawn to scale. They illustrate the disclosure by examples.

DETAILED DESCRIPTION

Illustrative examples and details are used in the drawings and in this description, but other configurations may exist and may suggest themselves. Parameters such as voltages, temperatures, dimensions, and component values are approximate. Terms of orientation such as up, down, top, and bottom are used only for convenience to indicate spatial relationships of components with respect to each other, and except as otherwise indicated, orientation with respect to external axes is not critical. For clarity, some known methods and structures have not been described in detail. Methods defined by the claims may comprise steps in addition to those listed, and except as indicated in the claims themselves the steps may be performed in another order than that given. Accordingly, the only limitations are imposed by the claims, not by the drawings or this description.

Optical modulators use polysilicon MOS capacitors to modulate optical carriers. There are significant material losses in polysilicon. If the polysilicon is doped to reduce its resistance, additional free carrier optical loss is introduced. The carrier mobility of polysilicon is also low. There has been a need for a more efficient optical modulator.

Figure 1:
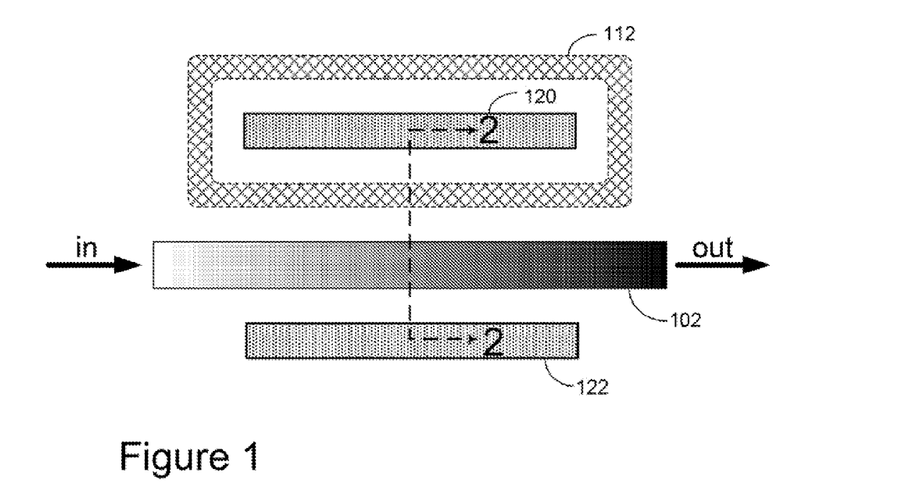
FIG. 1 is a top view of an example of a hybrid MOS optical modulator.
Figure 2:
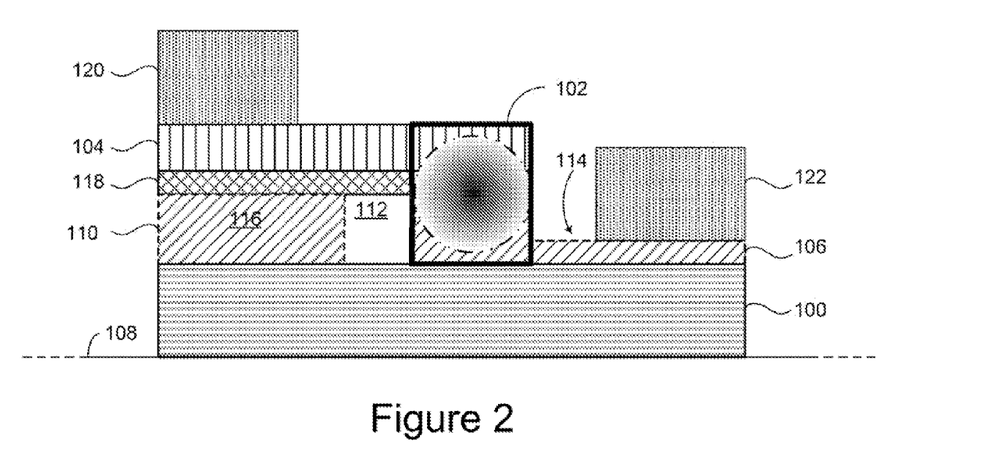
FIG. 2 is a sectional view along the line 2-2 of the optical modulator of FIG. 1.

FIGS. 1 and 2 give an example of a hybrid MOS optical modulator formed on a semiconductor substrate 100 (silicon in this instance). The optical modulator includes an optical waveguide 102, a cathode 104 comprising a first material and formed in the optical waveguide 102, and an anode 106 comprising a second material dissimilar from the first material and formed in the optical waveguide 102. The anode adjoins the cathode. A capacitor is defined between the anode and the cathode.

In some examples the substrate 100 comprises oxide grown on an underlying layer 108. A silicon device layer 110 is formed on the substrate 100. A trench 112 separates the device layer into two portions 114 and 116. The first portion 114 comprises the anode 106. The optical waveguide 102 is formed in the anode 106. The cathode 104, which in this example comprises a layer of III-V material, is integrated to the second portion 116. The cathode 104 may be formed by deposition, wafer bonding, monolithic growth, or other fabrication techniques. An MOS capacitor is defined between the cathode 104 and the anode 106.

A thin dielectric 118 is formed between the cathode 104 and the anode 106. The dielectric 118 can be native oxides of the cathode or the anode or both, or external dielectric materials such as high-k dielectrics or polymers which can be formed by deposition, oxidation, wafer bonding or other dielectric coating methods.

The cathode 104 may comprise negatively-doped silicon and the anode 106 may comprise positively-doped silicon. An electrode 120 is on the cathode 104 and an electrode 122 is on the anode 106. When a voltage is applied between the electrodes, carrier accumulation, depletion or inversion can occurs around dielectric 120. Because capacitor region overlaps with the optical waveguide, carrier concentration change leads to changes in waveguide modal refractive index and propagation loss. Optical intensity modulation and attenuation can be achieved.

Figure 3:
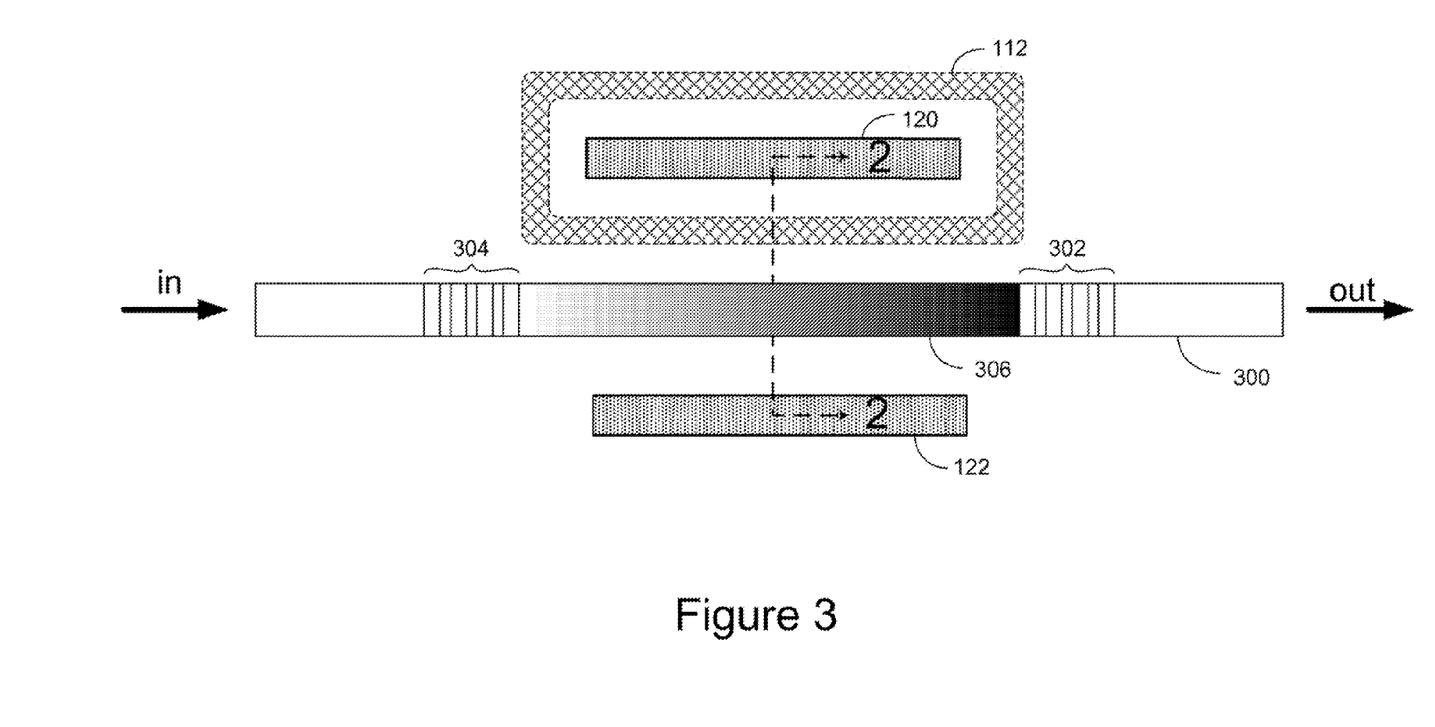
FIG. 3 is a top view of an example of a hybrid MOS a optical modulator that includes a Fabry-Perot resonator.

An example of an optical modulator that includes a Fabry-Perot resonator in its optical waveguide is shown in FIG. 3. Except the optical waveguide, the components of the optical modulator shown in FIG. 3 are similar to those shown in FIGS. 1 and 2. These components have the same reference numerals and will not be further discussed. The anode 106 and cathode 104 are adjacent to an optical waveguide 300. A plurality of partial reflectors 302 and 304 is formed in the optical waveguide 300 with certain distance, defining a Fabry-Perot resonator 306 in the optical waveguide between the pluralities of reflectors. The same concept can apply to light propagation direction (i.e., waveguide orientation) normal to the wafer surface besides a conventional in-plane waveguide situation.

Figure 4:
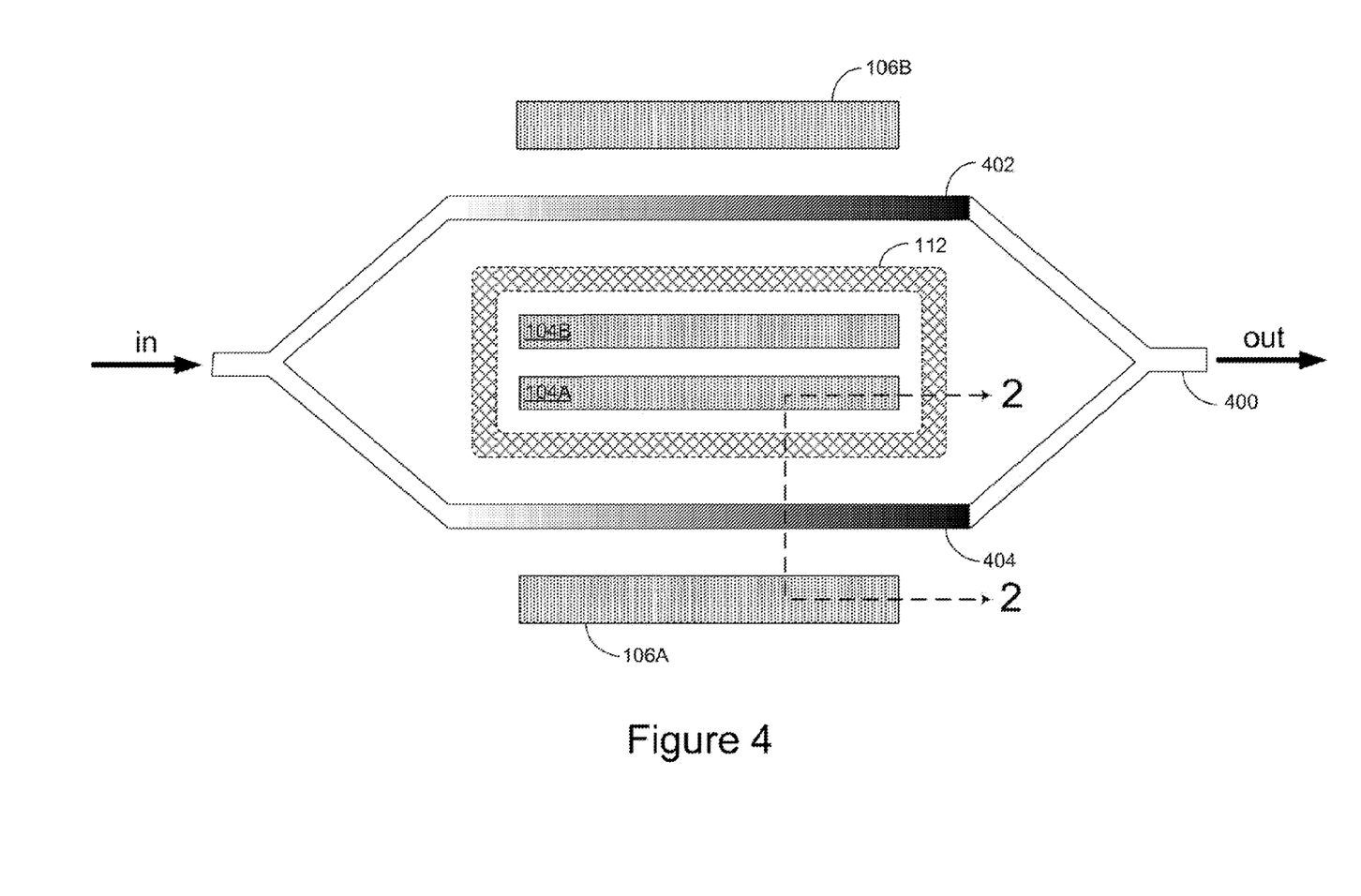
FIG. 4 is a top view of an example of a hybrid MOS a optical modulator in a Mach-Zender interferometer.

An example of an optical modulator formed as part of a Mach-Zender interferometer is shown in FIG. 4. Except the optical waveguide, the components of the optical modulator shown in FIG. 4 are similar to those shown in FIGS. 1 and 2; these components have the same reference numerals and will not be further discussed. In the optical modulator shown in FIG. 4, the anode 106 comprises first and second anodes 106A and 106B disposed on opposite sides of the cathode. In this example, the cathode, is formed in first and second sections 104A and 104B but in other examples only a single cathode is used. An optical waveguide 400 comprises first and second arms 402 and 404, and a hybrid MOS optical modulator as described above may be formed in the arm 404, as shown in FIG. 4, or in both arms, as may be desired.

Figure 5:
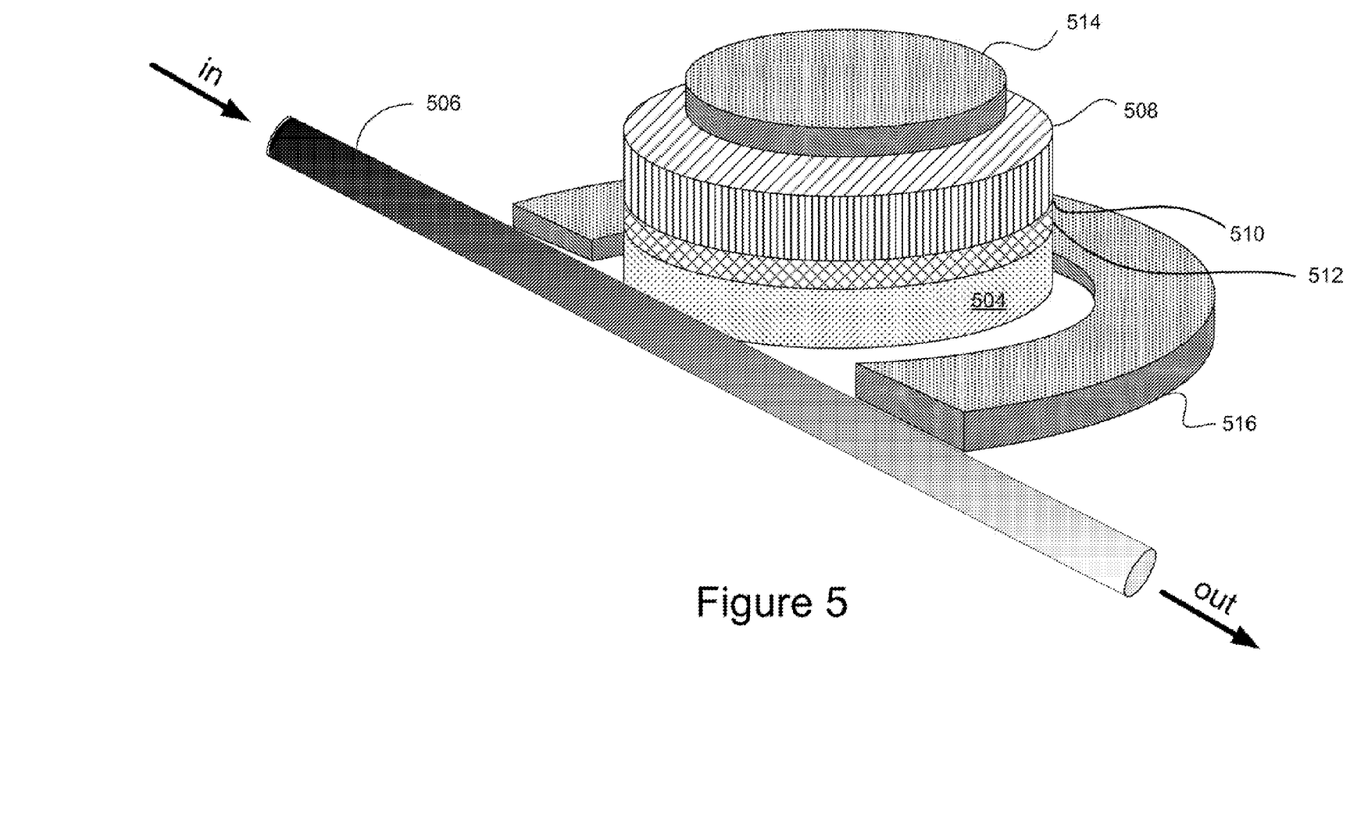
FIG. 5 is a perspective view of an example of a hybrid MOS ring-resonator optical modulator.
Figure 6:
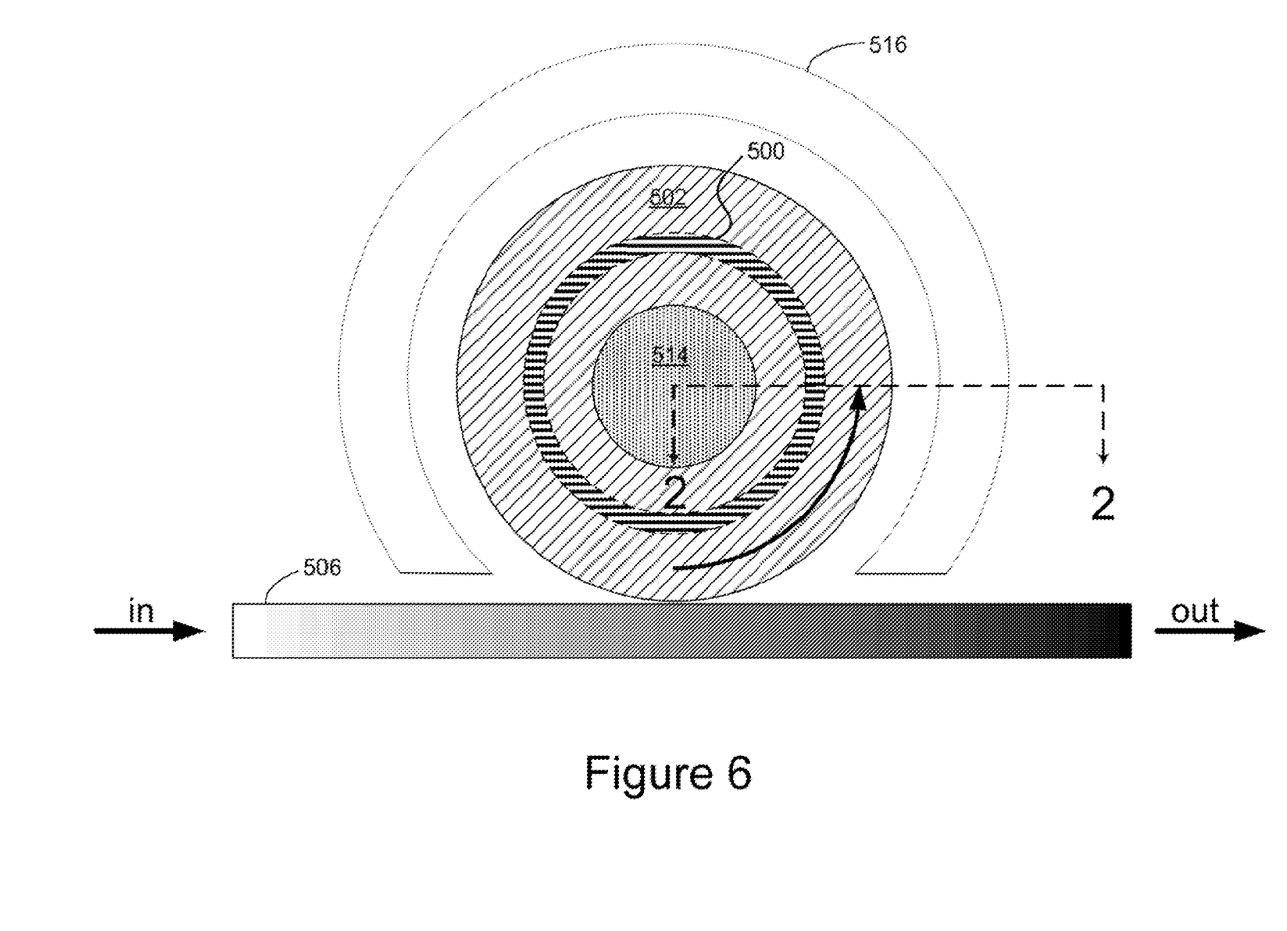
FIG. 6 is a top view of the modulator shown in FIG. 5.

FIGS. 5 and 6 give an example of a ring resonator optical modulator. Similarly to the examples already discussed, this example is formed on a substrate (not shown). A silicon device layer is formed on the oxide. An annular trench 500 divides the silicon device layer into first and second portions. The first portion defines an annular-shaped anode 502. The second portion defines a silicon layer 504 that underlies a cathode and is cylindrical in shape. A waveguide 506 is formed in the anode 502. A cathode 508, made of a material dissimilar to the anode, is integrated to the silicon layer 504. An MOS capacitor is defined across a boundary 510 between the cathode and the anode. The anode is partially annular and partially encircles the cathode.

As in the previous examples, a thin layer of oxide 512 is formed at the boundary between the cathode and the anode. This oxide forms a dielectric layer of the MOS capacitor. An electrode 514 is on the cathode and an electrode 516 is on the anode.

Figure 7:
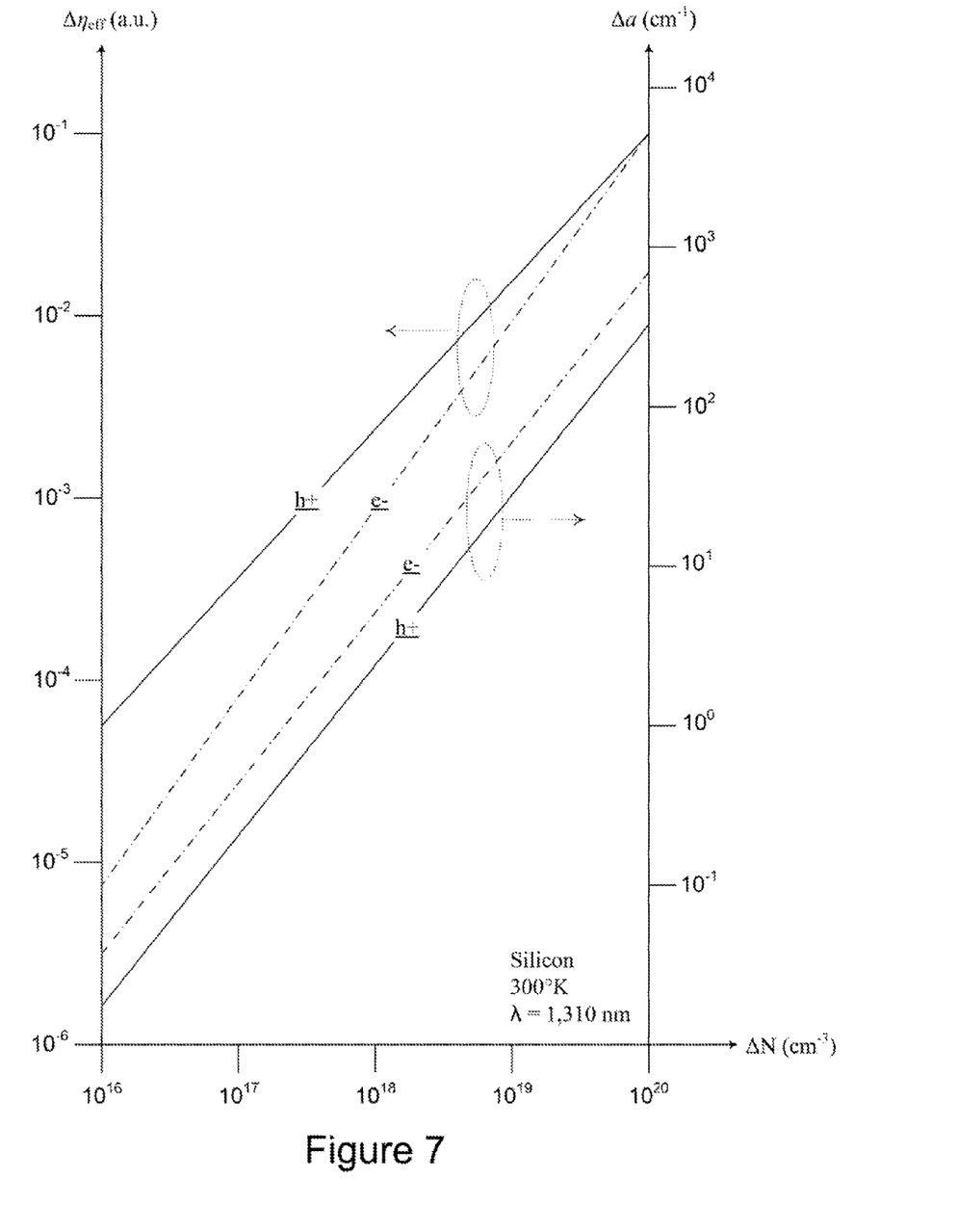
FIG. 7 shows relationships between carrier concentrations (electrons are e– and holes are h+) plotted against change in refractive index $\Delta\eta_{\it eff}$ (left axis) and change in absorptive loss $\Delta\alpha$ (right axis).

FIG. 7 shows relationships between carrier concentrations (electrons are e− and holes are h+) plotted against change in refractive index $\Delta n_{eff}$ (left axis) and change in absorptive loss $\Delta\alpha$ (right axis).

Figure 8:
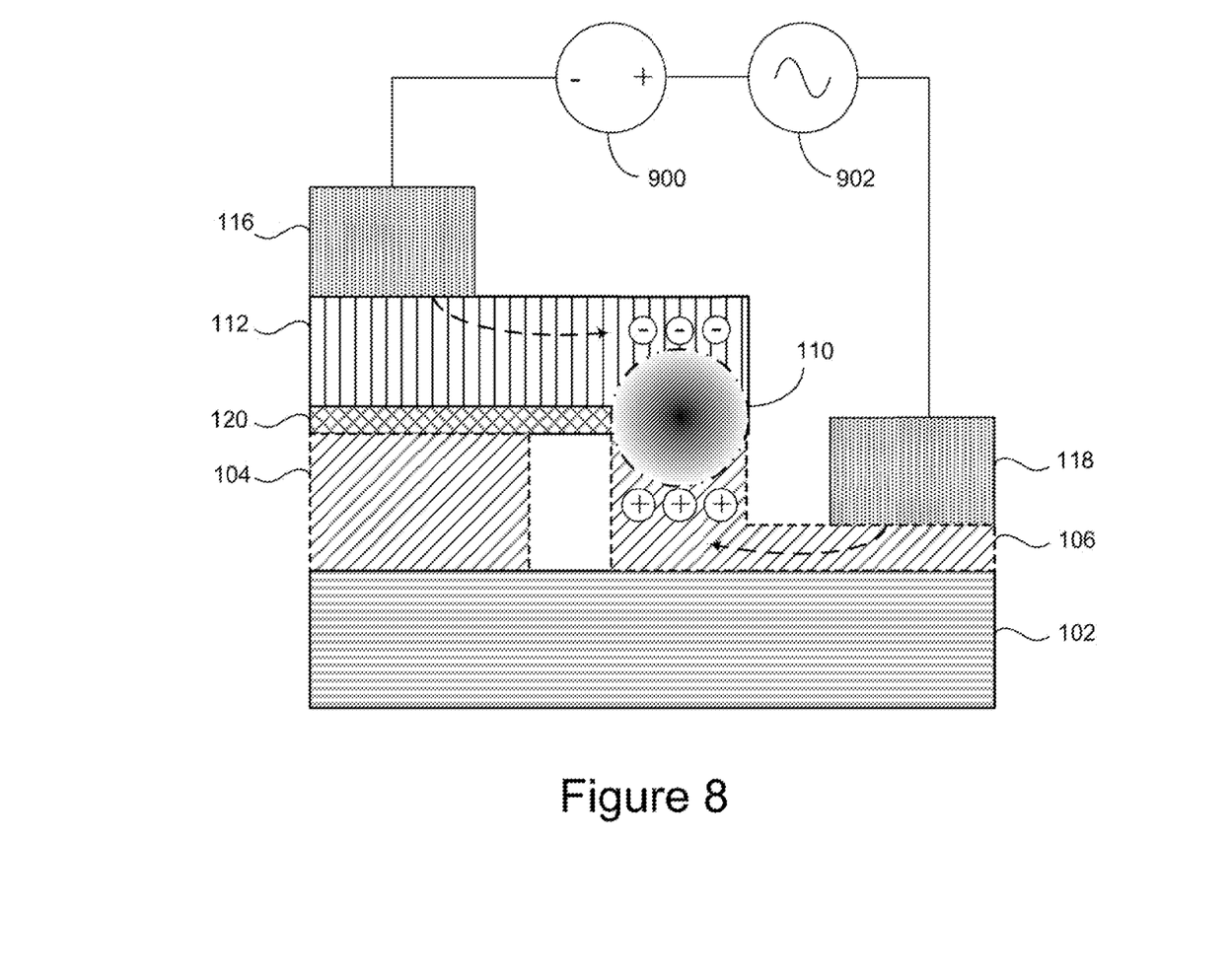
FIG. 8 shows an example of carrier concentrations in a hybrid MOS optical modulator under the influence of applied power

FIG. 8 gives an example of a DC power source 800 connected in series with an AC signal source 802. The AC signal source 802 provides a modulation signal with which a light beam in the optical waveguide 102 is to be modulated. The DC signal source 800 has a negative terminal connected to the cathode electrode 120 and a positive terminal connected through the AC signal source 802 to the anode electrode 122. This results in a migration of negative charges from the cathode 104 toward a side of the waveguide, and migration of positive charges ("holes") from the anode 106 through the waveguide portion 106 of the intrinsic silicon to an opposite side of the waveguide 102. In other examples the sources 800 and 802 may be connected in parallel or the polarity of the DC power source may be reversed, or one of the sources may be omitted.

The MOS capacitor forms at the boundary between the III-V material and the underlying capacitor portion of the intrinsic silicon. A very thin layer of silicon and III-V oxides, in some examples about a few nanometers thick, forms naturally at this boundary and serves as a dielectric for the capacitor. In some examples no special steps are taken to encourage the formation of this oxide. In other examples the oxide formation may be stimulated, for example by elevating the temperature, exposing the materials to an oxygen-rich atmosphere, or other suitable technique.

In some examples the III-V material comprises indium phosphide. In other examples the III-V material comprises gallium arsenide or other compounds of indium, gallium, phosphorus, and arsenic. More generally, the cathode and anode are formed of dissimilar materials which may comprise II-VI semiconductor compounds or other materials. Metals may be used.

As discussed previously, the MOS capacitor is formed inside the waveguide so that charge carriers that accumulate/deplete on either side of the capacitor dielectric have the effect of changing the index of refraction of the waveguide and waveguide loss.

The MOS capacitor can operate in accumulation, depletion or inversion mode. As discussed above, one or both of an AC voltage for signal modulator and a DC voltage can be applied between anode and cathode, causing a thin charge layer to accumulate, deplete, or invert on both sides of the dielectric. The resulting change in free carrier density causes a change in refractive index n of one or both of the cathode and anode and is manifested as a change in the effective refractive index of the optical mode ($\Delta n_{eff}$). The optical phase shift $\Delta\phi$ at the end of the capacitor depends on the magnitude of this voltage-induced $\Delta n_{eff}$, the device length L, and the optical wavelength $\lambda$, and can be calculated as $\Delta\phi=2\pi\Delta n_{eff}L\lambda$. The material loss of silicon and III-V also changes simultaneously as carrier density change, and can be used as optical attenuator.

Figure 9A:
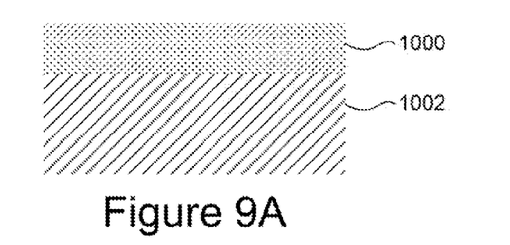
FIGS. 9A-9H are sectional views of an example of fabricating a hybrid MOS optical modulator.
Figure 9B:
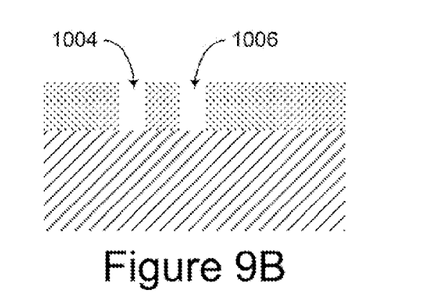
Figure 9C:
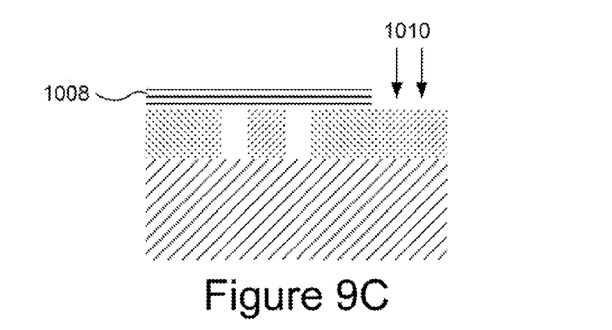
Figure 9D:
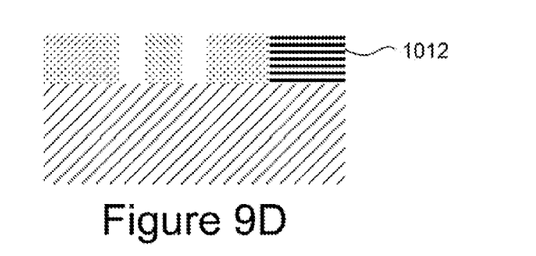
Figure 9E:
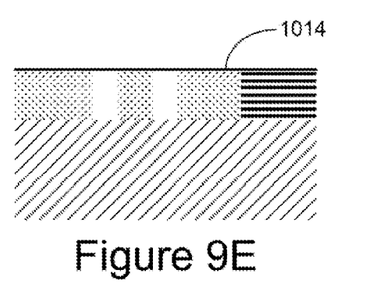
Figure 9F:
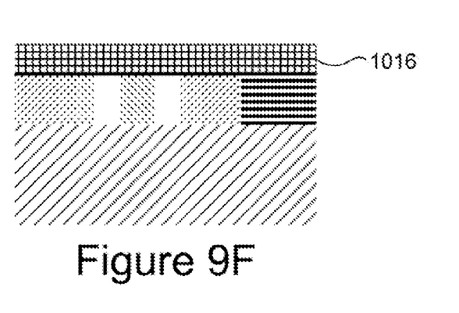
Figure 9G:
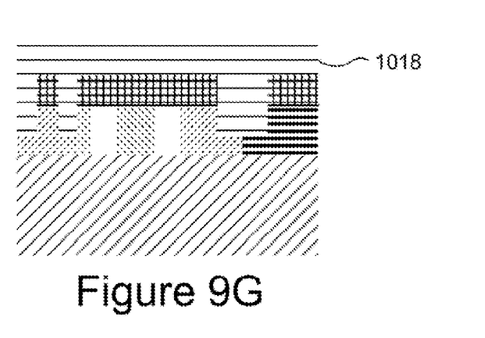
Figure 9H:
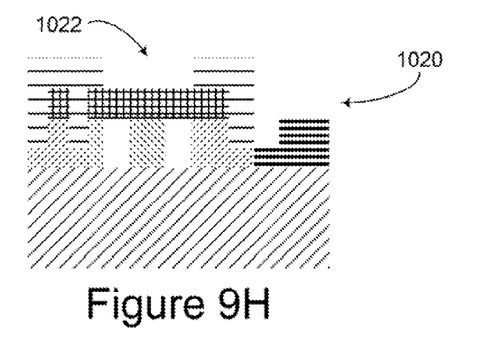

FIGS. 9A-9H are views of various stages of fabricating a hybrid MOS optical attenuator according to an example. FIG. 9A shows a layer 1000 of a first material, in this example process silicon, on a substrate 1002 which may be for example $SiO_2$. FIG. 9B shows one or more isolation trenches, in this example 1004 and 1006 etched in the process silicon. In FIG. 9C a mask 1008 has been placed over part of the process silicon and doping being performed on another part that will become an anode, as indicated by arrows 1010. FIG. 9D shows an anode 1012 having been formed in the process silicon by the doping, and the mask 1008 having been removed. FIG. 9E shows a thin layer of oxide 1014 atop the process silicon; as discussed above, this oxide layer may occur naturally without any process step to form it, for example during the next step, or it may be formed by any suitable process for growing a thin oxide layer. FIG. 9F shows a cathode 1016 of a second material dissimilar from the first, which in this example may be a III-V compound, on the anode 1002 of first material with the dielectric 1014 between the layers of first and second material. FIG. 9G shows another layer of material 1018 over the anode and cathode, and formation of an optical waveguide 1020. FIG. 9H shows removal of material to expose a part 1022 of the anode 1002 and a part 1024 of the cathode 1016 for installation of contacts.

Figure 10A:
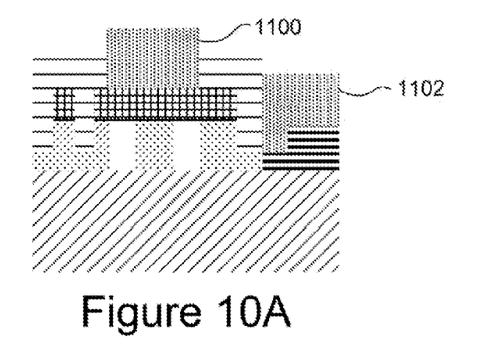
FIGS. 10A-10B are sectional views of an example of installing contacts on a hybrid MOS optical modulator.
Figure 10B:
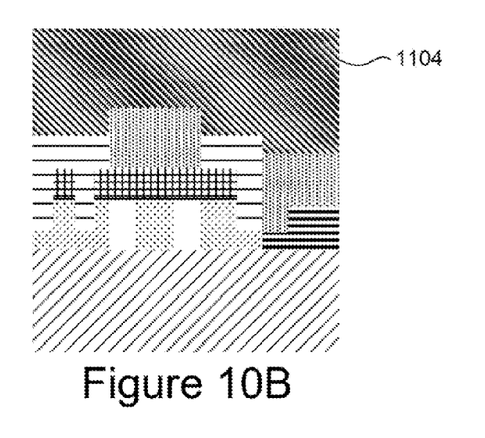
Figure 11:
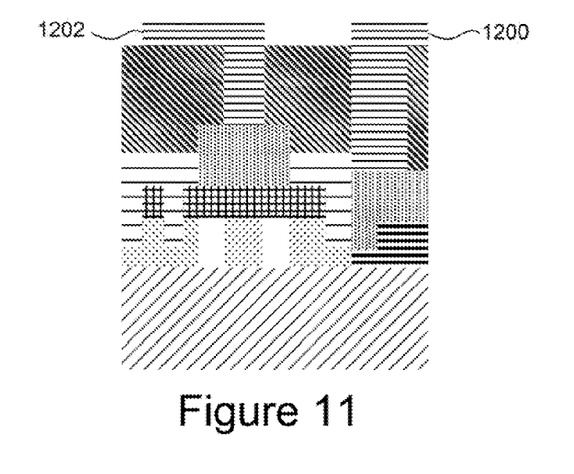
FIG. 11 is a sectional view of an example of installing contacts on a hybrid MOS optical modulator.

FIGS. 10A-10B and 11 are views of an example of fabricating contacts on a hybrid MOS optical modulator of the kind described previous. FIG. 10A shows an anode conductor 1100 deposited on an anode, for example through an opening such as the opening 1022 in FIG. 9H, and a cathode conductor 1102 deposited on a cathode, for example through an opening such as the opening 1024 in FIG. 9H. FIG. 10B shows an insulating material 1104 over the conductors, and FIG. 11 shows external contacts 1200 and 1202 extending from the anode and cathode, respectively, through the material 1104.

Figure 12:
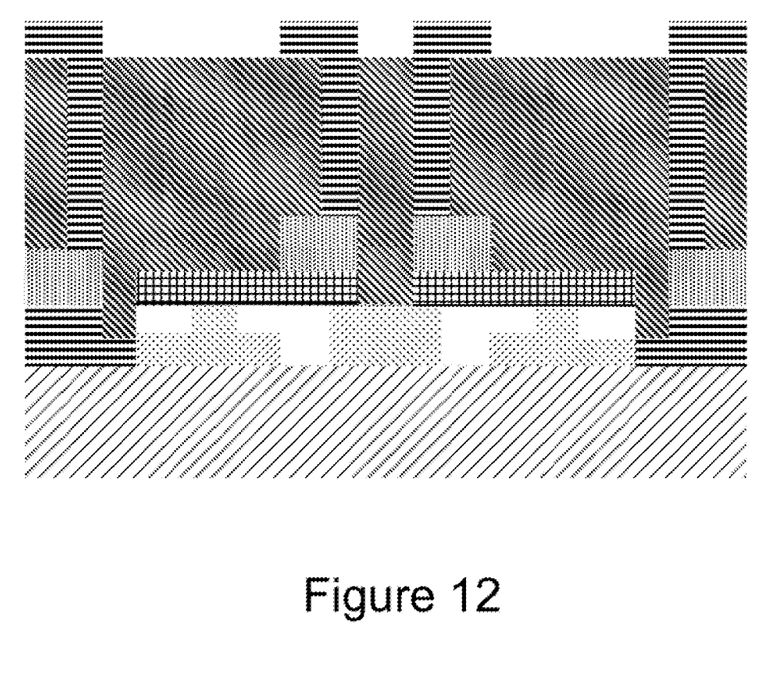
FIG. 12 is a sectional view of an example of a ring resonator hybrid MOS modulator.

A similar process with similar steps may be used to fabricate a Mach-Zender interferometer with a hybrid MOS optical modulator in one or both optical paths. FIG. 12 shows an example of such a device. In some such examples, the device includes a first anode and a second anode, first and second anode conductors on the first and second anode, respectively, and first and second external anode contacts. First and second cathodes are formed of a material dissimilar to that of the first and second anodes. In some examples only one cathode, generally centered between the two anodes, is used. First and second external contacts provide electrical communication with the first and second cathodes, respectively. Trenches separate the cathodes from the anodes. As in the previous examples, a capacitor is defined between the cathode and the anode, and a capacitor is defined between the cathode and the anode.

In some examples the cathode material is wafer-bonded to the anode. This may include annealing, for example at 300° C. or some other suitable temperature. In other examples no annealing is done.

The disclosed MOS optical modulator is more efficient than a polycrystalline silicon optical modulator. Carrier mobility is higher, and resistance is lower, in III-V material than in polycrystalline silicon. Material loss at the same doping level is lower. The fabrication process is simple and relatively inexpensive. The modulator may also find an application as an optical attenuator and phase shifter. It can be readily integrated with light sources, e.g., hybrid silicon lasers.

I claim:

1. A hybrid MOS optical modulator comprising:
   an optical waveguide;
   a cathode comprising a first material and formed in the optical waveguide;
   an anode comprising a second material dissimilar from the first material and formed in the optical waveguide, the anode adjoining the cathode, a capacitor being defined between the anode and the cathode; and
   a dielectric disposed between the cathode and the anode, wherein the dielectric comprises an oxide of the first material and an oxide of the second material, and wherein the first material comprises indium phosphide and the second material comprises silicon.

2. The optical modulator of claim 1 wherein the capacitor is bounded by an isolation trench adjacent the optical waveguide.

3. The optical modulator of claim 1 wherein the optical modulator defines a microring shape.

4. The optical modulator of claim 1 wherein:
   the capacitor is generally circular in shape; and
   one of the cathode and anode is generally circular in shape and the other is partially annular in shape and partially encircles the one.

5. The optical modulator of claim 1 and further comprising a plurality of partial reflectors formed in the optical waveguide and defining therebetween a Fabry-Perot resonator, the Fabry-Perot resonator at least partially surrounding the capacitor.

6. The optical modulator of claim 1 wherein:
   the anode comprises first and second anodes disposed on opposite sides of the cathode and defining a first channel between the first anode and the cathode and a second channel between the second anode and the cathode; and
   the optical waveguide comprises a first branch disposed in the first channel adjacent the capacitor and a second branch disposed in the second channel, the optical modulator comprising a Mach-Zender structure.

7. The optical modulator of claim 1 and further comprising at least one additional electrode comprising a material dissimilar to at least one of the cathode and the anode, the third electrode formed in the optical waveguide and defining with at least one of the cathode and the anode another capacitor.

8. The optical modulator of claim 1 wherein the cathode and anode are integrated by at least one of wafer bonding and monolithic growth.

9. A method of fabricating an optical modulator comprising:
   forming an isolation trench in a first semiconductor layer carried by a substrate;
   implanting ions in a portion of the first semiconductor layer;
   forming a second semiconductor layer on the first semiconductor layer, the second semiconductor dissimilar from the first semiconductor, a capacitor being defined between the first and second semiconductor layers;
   forming an optical waveguide in the first and second semiconductor layers;
   removing a portion of the second semiconductor layer to expose a portion of the first semiconductor layer;
   forming an electrode on the exposed portion of the first semiconductor layer; and
   forming an electrode on the second semiconductor layer.

10. The method of claim 9 and further comprising forming a dielectric between the first and second semiconductor layers.

11. The method of claim 10 wherein forming the dielectric comprises at least one of wafer bonding the second semiconductor layer to the first semiconductor layer, depositing a dielectric on the first semiconductor layer, inducing oxidation of at least one of the first and second semiconductor layers, and spinning.

12. An optical modulator comprising:
    an optical waveguide;
    a cathode comprising a III-V semiconductor material and formed in the optical waveguide;
    an anode comprising silicon and formed in the optical waveguide, the anode adjoining the cathode, a capacitor being defined between the anode and the cathode; and
    a dielectric disposed between the cathode and the anode, wherein the dielectric comprises an oxide of the III-V semiconductor material and an oxide of the silicon of the anode, wherein the III-V semiconductor material comprises indium phosphide.

13. The optical modulator of claim 12, wherein the cathode has a cylindrical shape and the anode has an annular shape.

14. The optical modulator of claim 12, wherein the anode includes a first anode portion disposed away from the cathode in a first direction and a second anode portion disposed away from the cathode in a second direction opposite the first direction.

15. The optical modulator of claim 14, wherein the optical waveguide includes a first arm disposed between the cathode and the first anode portion and a second arm disposed between the cathode and the second anode portion.

16. The optical modulator of claim 12, wherein the optical waveguide includes:
    a waveguide portion;
    a first set of partial reflectors disposed on a first side of the waveguide portion; and
    a second set of partial reflectors disposed on a second side of the waveguide portion opposite the first side to define a resonator within the waveguide portion.

17. The optical modulator of claim 12, wherein the optical waveguide and the anode are disposed directly on a substrate, and wherein the dielectric is disposed on the substrate such that a trench adjacent the optical waveguide is disposed between the substrate and a portion of the dielectric.

18. The optical modulator of claim 17, wherein the portion of the dielectric is a first portion and wherein a device layer is disposed between the substrate and a second portion of the dielectric.

\* \* \* \* \*